(12) United States Patent
Hirabayashi et al.

(10) Patent No.: US 10,421,335 B2
(45) Date of Patent: Sep. 24, 2019

(54) VEHICLE COMPRISING AIR CONDITIONING APPARATUS

(71) Applicant: TOYOTA JIDOSHA KABUSHIKI KAISHA, Toyota-shi, Aichi-ken (JP)

(72) Inventors: Hidekazu Hirabayashi, Chiryu (JP); Kunihiko Jinno, Toyota (JP); Hiroaki Matsumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1393 days.

(21) Appl. No.: 14/474,388

(22) Filed: Sep. 2, 2014

(65) Prior Publication Data

US 2015/0099443 A1    Apr. 9, 2015

(30) Foreign Application Priority Data

Oct. 4, 2013    (JP) .................................. 2013-209312

(51) Int. Cl.
*B60H 1/00* (2006.01)
*B60H 1/22* (2006.01)

(52) U.S. Cl.
CPC ..... *B60H 1/00657* (2013.01); *B60H 1/00778* (2013.01); *B60H 1/2218* (2013.01); *B60H 2001/2234* (2013.01)

(58) Field of Classification Search
CPC ............ B60H 1/00657; B60H 1/00778; B60H 1/2218; B60H 2001/2234
USPC ........................................................ 454/75
See application file for complete search history.

(56) References Cited

U.S. PATENT DOCUMENTS

| 5,259,814 A * | 11/1993 | Weissbrich | B60H 1/00807 236/49.3 |
| 5,361,593 A * | 11/1994 | Dauvergne | B60H 1/00642 165/238 |
| 2004/0194479 A1 * | 10/2004 | Umebayashi | B60H 1/00642 62/126 |

(Continued)

FOREIGN PATENT DOCUMENTS

| JP | H06-48167 A | 2/1994 |
| JP | H07-266842 A | 10/1995 |

(Continued)

OTHER PUBLICATIONS

English Abstract translation of document JP-3028065B2.*

*Primary Examiner* — Helena Kosanovic
(74) *Attorney, Agent, or Firm* — Oliff PLC (57) ABSTRACT

A vehicle includes an air conditioning apparatus configured to be capable of executing ventilation operation to supply air outside the vehicle into a passenger compartment, and cooling operation to supply cool air into the passenger compartment; and a control unit that causes the air conditioning apparatus to execute remote air conditioning in which air conditioning is performed while a user is not in the vehicle, and operated air conditioning in which air conditioning is performed by the user's operation while the user is in the vehicle. The control unit controls the air conditioning apparatus such that a condition in which the ventilation operation is executed in the remote air conditioning is more relaxed than a condition in which the ventilation operation is executed in the operated air conditioning. In this way, power consumption by pre-air conditioning can be reduced.

1 Claim, 7 Drawing Sheets

(56) References Cited

U.S. PATENT DOCUMENTS

2012/0240607 A1* 9/2012 Misumi ................ B60H 1/3207
62/126

FOREIGN PATENT DOCUMENTS

| | | | |
|---|---|---|---|
| JP | 3028065 B2 * | 4/2000 |
| JP | 2003-154842 A | 5/2003 |
| JP | 2004-256092 A | 9/2004 |
| JP | 2004-291679 A | 10/2004 |
| JP | 2010-139144 A | 6/2010 |
| JP | 2011-020477 A | 2/2011 |
| JP | A-2012-76517 | 4/2012 |

* cited by examiner

VEHICLE COMPRISING AIR CONDITIONING APPARATUS

This nonprovisional application is based on Japanese Patent Application No. 2013-209312 filed on Oct. 4, 2013, with the Japan Patent Office, the entire contents of which are hereby incorporated by reference.

BACKGROUND OF THE INVENTION

Field of the Invention

The present invention relates to vehicles, and particularly, air conditioning of vehicles.

Description of the Background Art

Pre-air conditioning to perform air conditioning of a vehicle before a user rides in the vehicle has previously been known. Pre-air conditioning is performed to reduce a thermal discomfort when the user rides in the vehicle. In an electric vehicle or a hybrid vehicle (which may also be simply referred to as a "vehicle" hereinafter) that uses the electric power of a battery as a running source, electric power consumed by an air conditioning apparatus used for the pre-air conditioning is supplied from, for example, the battery and a power supply outside the vehicle (external power supply) connected to the vehicle to charge the battery (see Japanese Patent Laying-Open No. 2012-076517, for example). Pre-air conditioning may be performed while the user is not in the vehicle, by setting a timer or by remote operation (remote air conditioning).

The user may often cause the vehicle to run immediately after the completion of charging the battery. In that case, the pre-air conditioning is performed during charging of the battery. That is, electric power from the external power supply is used for both charging of the battery and the pre-air conditioning. Consequently, electric power for charging the battery decreases by the amount of power consumption by the pre-air conditioning, and thus, it takes time to charge the battery.

Moreover, the user may sometimes cause the vehicle to run after a short time from the completion of charging the battery. In that case, the pre-air conditioning is performed after the completion of charging the battery. When charging of the battery has been completed, a charging cable for connecting the external power supply to the vehicle may have been removed from the vehicle. At this time, since the vehicle cannot utilize electric power from the external power supply, the pre-air conditioning is performed with the electric power of the battery. Consequently, the state of charge (SOC) of the battery will decrease.

Japanese Patent Laying-Open No. 2012-076517 suggests control to gradually reduce an upper limit value of power consumption by the pre-air conditioning, as time passes. In this way, the SOC of the battery is prevented from decreasing in the pre-air conditioning. Such control involves consumption of a large amount of electric power at the beginning of the pre-air conditioning, resulting in large power consumption (amount of electric power consumed) by the pre-air conditioning.

SUMMARY OF THE INVENTION

An object of the present invention is to reduce power consumption by the pre-air conditioning.

In one aspect, the present invention provides a vehicle. The vehicle includes an air conditioning apparatus configured to be capable of executing ventilation operation to supply air outside the vehicle into a passenger compartment, and cooling operation to supply cool air into the passenger compartment; and a control unit that causes the air conditioning apparatus to execute remote air conditioning in which air conditioning is performed while a user is not in the vehicle, and operated air conditioning in which air conditioning is performed by the user's operation while the user is in the vehicle. The control unit controls the air conditioning apparatus such that a condition in which the ventilation operation is executed in the remote air conditioning is more relaxed than a condition in which the ventilation operation is executed in the operated air conditioning.

A temperature in the passenger compartment often becomes higher than an air temperature outside the vehicle. In that case, the temperature in the passenger compartment can be reduced (cooled) by the ventilation operation. That is, cooling of the inside of the passenger compartment can be performed not only by the cooling operation but also by the ventilation operation. The ventilation operation has a cooling effect (an instantaneous effect, for example) lower than that of the cooling operation. The ventilation operation, however, requires power consumption lower than that by the cooling operation. The operated air conditioning while the user is in the vehicle requires the instantaneous effect of cooling. On the other hand, the remote air conditioning while the user is not in the vehicle does not require an effect as instantaneous as that of the operated air conditioning. In the vehicle having the structure described above, the condition in which the ventilation operation is executed in the remote air conditioning is more relaxed than the condition in which the ventilation operation is executed in the operated air conditioning. That is, the frequency of the cooling operation in the remote air conditioning is reduced, Consequently, the power consumption by the remote air conditioning is reduced.

Preferably, the control unit controls the air conditioning apparatus such that in the remote air conditioning, the ventilation operation is executed where an air temperature outside the vehicle is lower than an air temperature inside the passenger compartment, and the cooling operation is executed where the air temperature outside the vehicle is higher than the air temperature inside the passenger compartment.

With this structure, the ventilation operation is executed where the air temperature outside the vehicle is lower than that inside the passenger compartment. That is, the inside of the passenger compartment is cooled by the ventilation operation.

More preferably, the control unit controls the air conditioning apparatus such that in the remote air conditioning, the cooling operation is executed where a set temperature of the air conditioning apparatus is not higher than a prescribed temperature.

When the set temperature of the air conditioning apparatus is relatively low, it is likely that the user is requiring the instantaneous effect of cooling. With this structure, the cooling operating having an effect more instantaneous than that of the ventilation operation is executed, thus satisfying the user's need.

Alternatively, the control unit controls the air conditioning apparatus such that in the remote air conditioning, the cooling operation is executed where a set time of the remote air conditioning is not longer than a prescribed time.

The set time of the remote air conditioning is a duration of performing the remote air conditioning. Even where a set time of the pre-air conditioning, which is the duration of performing the remote air conditioning, is relatively short, it is likely that the user is requiring the instantaneous effect of cooling. With this structure, the cooling operation is executed, thus satisfying the user's need.

Moreover, preferably, the control unit controls the air conditioning apparatus such that in the remote air conditioning, the cooling operation is executed where the air temperature outside the vehicle is higher than the air temperature inside the passenger compartment, and controls the air conditioning apparatus such that where the air temperature outside the vehicle is lower than the air temperature inside the passenger compartment, the cooling operation is executed when the air temperature outside the vehicle is higher than a prescribed temperature, and the ventilation operation is executed when the air temperature outside the vehicle is not higher than the prescribed temperature.

Where the air temperature outside the vehicle is relatively high, an effect of cooling by the ventilation operation cannot be readily obtained. With this structure, since the cooling operation is executed when the air temperature outside the vehicle is higher than the prescribed temperature, the passenger compartment is cooled well.

Alternatively, the control unit controls the air conditioning apparatus such that in the remote air conditioning, the cooling operation is executed where the air temperature outside the vehicle is not lower than the air temperature inside the passenger compartment, and controls the air conditioning apparatus such that where the air temperature outside the vehicle is lower than the air temperature inside the passenger compartment, the cooling operation is executed when a time during which the remote air conditioning is being executed has become longer than a prescribed time, and the ventilation operation is executed when a time during which the remote air conditioning is being executed is not longer than the prescribed time.

If the ventilation operation is prolonged, the pre-air conditioning may take too much time. With this structure, the cooling operation is executed when the prescribed time has passed, thus cooling the passenger compartment within an appropriate time.

Furthermore, in another aspect of the present invention, a vehicle includes an air conditioning apparatus configured to be capable of executing ventilation operation to supply air outside the vehicle into a passenger compartment, and cooling operation to supply cool air into the passenger compartment; and a control unit that causes the air conditioning apparatus to execute the remote air conditioning in which air conditioning is performed by remote operation, and the operated air conditioning in which air conditioning is performed by operation of an operating panel in the passenger compartment. The control unit controls the air conditioning apparatus such that a condition in which the ventilation operation is executed in the remote air conditioning is more relaxed than a condition in which the ventilation operation is executed in the operated air conditioning.

In the vehicle having this structure, the user can specify the remote air conditioning or the operated air conditioning, by using the remote operation or the operation of the operating panel depending on the case.

According to the present invention, power consumption by the pre-air conditioning is reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in detail hereinafter, with reference to the drawings. In the drawings, identical or corresponding parts are denoted by identical numerals, and description thereof will not be repeated.

Figure 1:
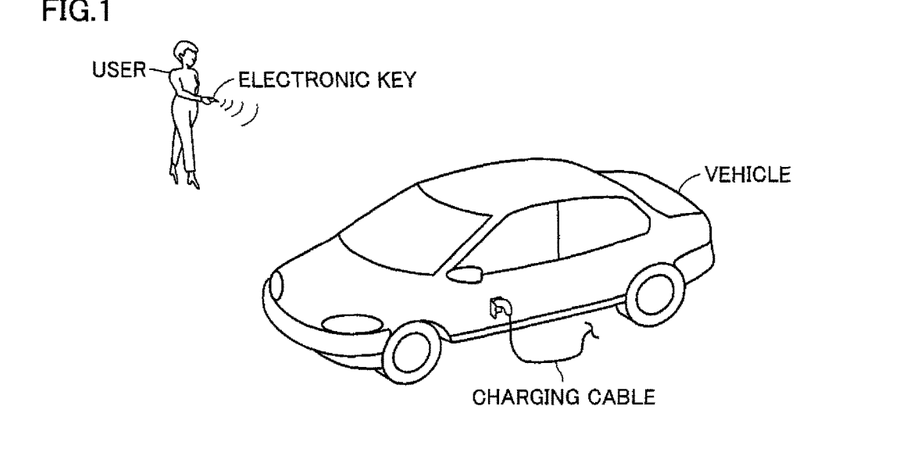
FIG. 1 is a diagram for illustrating a pre-air conditioning (pre-ride air conditioning drive) system.
Figure 2:
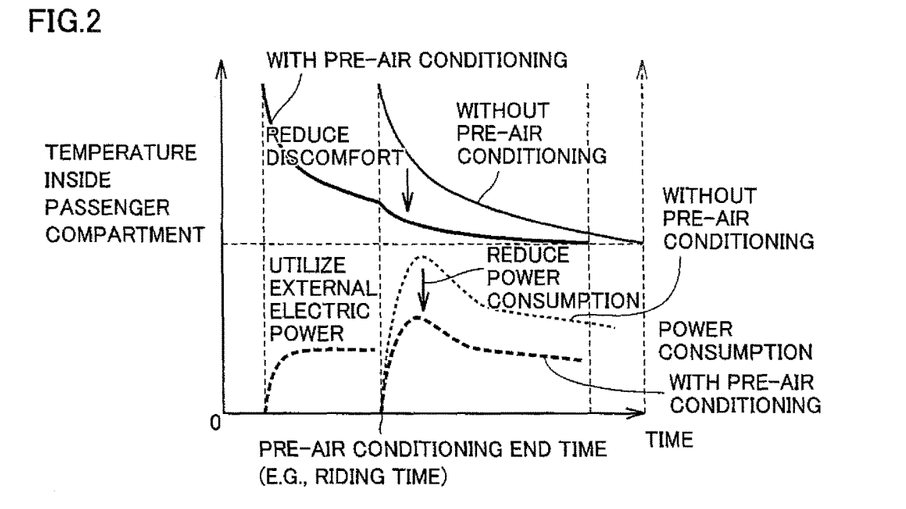
FIG. 2 is a diagram for illustrating a pre-air conditioning (pre-ride air conditioning drive) system.

FIGS. 1 and 2 are diagrams for illustrating a pre-air conditioning (pre-ride air conditioning drive) system. FIG. 1 is a diagram for illustrating a user's operation, and FIG. 2 is a graph comparing temperatures in a passenger compartment and power consumption with and without the pre-air conditioning.

As shown in FIG. 1, the user can control the vehicle by operating an electronic key even where the vehicle is in a state in which it cannot run, for example, where the user is not in the vehicle. Instead of the electronic key, a portable communication terminal such as a smartphone or the like may be used. The electronic key is configured to be capable of communicating with the vehicle wirelessly or the like. Operation of the electronic key includes air conditioning operation of the vehicle (remote air conditioning). The operation of the electronic key may include user verification, lock control of a vehicle door, and the like.

The vehicle is a hybrid vehicle or an electric vehicle including as a running source a power storage device (battery) not shown in the figure. The battery can be charged with electric power from a power supply outside the vehicle (external power supply) through a charging cable. Such a hybrid vehicle may also be referred to as a plug-in hybrid vehicle.

The vehicle can be air-conditioned by the air conditioning apparatus mounted on the vehicle. The air conditioning apparatus basically operates on electric power from the battery. Before riding in the vehicle, the user can perform air conditioning of the vehicle (pre-air conditioning) by operating the electronic key. Furthermore, where the vehicle is in a state in which it can run, for example, where the user is in the vehicle, the user can perform air conditioning by operating the operating panel (not shown) in the passenger compartment (operated air conditioning). When the pre-air conditioning is performed during charging of the battery, electric power from the external power supply can also be used for the pre-air conditioning.

In FIG. 2, the upper part of the graph represents temperatures in the passenger compartment. Initially, the temperature in the passenger compartment is relatively high. A high temperature in the passenger compartment gives the user a thermal discomfort. Where the pre-air conditioning is not performed ("WITHOUT PRE-AIR CONDITIONING" in the graph), the temperature in the passenger compartment at a riding time is the same as that before riding. The user who has ridden in the vehicle thus feels uncomfortable. Thereafter, air conditioning is started by the user operating the operating panel, for example, and the temperature in the passenger compartment decreases. On the other hand, where the pre-air conditioning is performed ("WITH PRE-AIR CONDITIONING" in the graph), air conditioning is performed prior to the riding time. The temperature in the passenger compartment is thus relatively low at the riding time. Consequently, the user who has ridden in the vehicle feels comfortable. In this way, the pre-air conditioning reduces the thermal discomfort felt by the user.

In FIG. 2, the lower part of the graph represents power consumption for air conditioning. Where the pre-air conditioning is not performed ("WITHOUT PRE-AIR CONDITIONING" in the graph), power consumption by air conditioning occurs after the riding time. This power consumption corresponds to power consumption of the battery. On the other hand, where the pre-air conditioning is performed ("WITH PRE-AIR CONDITIONING" in the graph), electric power from the external power supply (external electric power) is utilized prior to the riding time. Consequently, where the pre-air conditioning is performed, the power consumption by air conditioning after the riding time, that is, the power consumption of the battery, is reduced as compared to the case where the pre-air conditioning is not performed.

The air conditioning apparatus is capable of executing cooling operation to supply cool air into the passenger compartment or heating operation to supply warm air into the passenger compartment. Additionally, the air conditioning apparatus can execute ventilation operation to supply air outside the passenger compartment into the passenger compartment.

Figure 3:
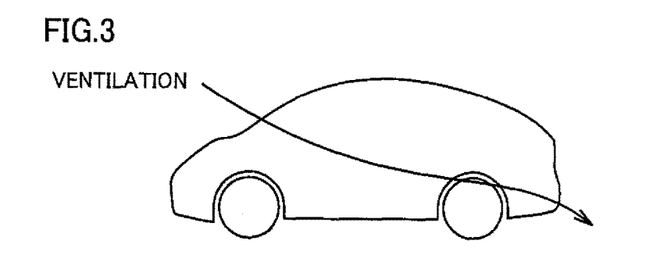
FIG. 3 is a diagram for illustrating air flow in ventilation operation.

FIG. 3 is a diagram for illustrating air flow in the ventilation operation. As shown in FIG. 3, in the ventilation operation, air outside the vehicle is drawn into the passenger compartment through an outside air intake port at the front of the vehicle, for example. Air in the passenger compartment (indoor air) is exhausted through a vent duct at the rear of the vehicle, for example.

Figure 4:
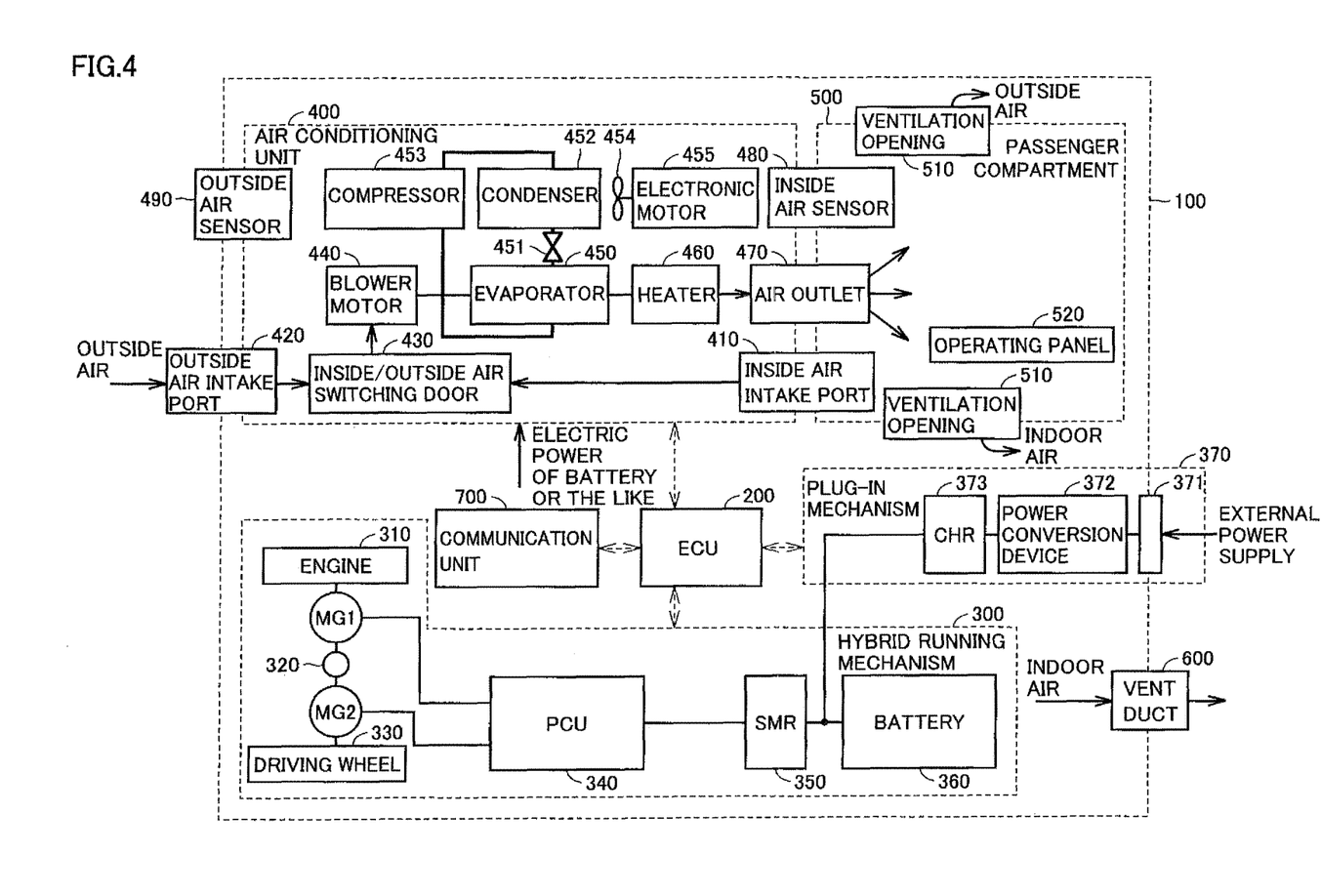
FIG. 4 is a diagram for illustrating one example of a schematic structure of a vehicle according to an embodiment.

FIG. 4 is a diagram for illustrating one example of a schematic structure of a vehicle according to an embodiment. Vehicle 100 includes an ECU (Electric Control Unit) 200, which is a control unit that controls components included in vehicle 100. Vehicle 100 is a so-called plug-in hybrid vehicle. Vehicle 100 therefore includes a hybrid running mechanism 300 and a plug-in mechanism 370. Vehicle 100 also includes an air conditioning apparatus (air conditioning unit) 400 for air-conditioning the inside of passenger compartment 500. Vehicle 100 further includes a vent duct 600 and a communication unit 700.

Hybrid running mechanism 300 can drive motor generators MG1, MG2 with an internal combustion engine (engine) 310. Output torque of motor generators MG1, MG2 is transmitted to a driving wheel 150 via a power transmission gear 140. Electric power stored in a power storage device (battery) 360 is converted into electric power for driving motor generators MG1, MG2 by a PCU (Power Control Unit) 340. Electric power generated at motor generators MG1, MG2 can also be converted into electric power for charging battery 360 by PCU 340. A system main relay SMR switches between a connected state and a non-connected state of battery 360 and PCU 340. Electric power of battery 360 is also utilized for air conditioning unit 400.

Plug-in mechanism 370 is configured to be supplied with electric power from a power supply outside vehicle 100 through an inlet 371. Electric power supplied to inlet 371 is converted by a power conversion device 372. The converted electric power is supplied to battery 360 as charging electric power via a charging relay (CHR) 373.

Air conditioning unit 400 includes an inside air intake port 410, an outside air intake port 420, inside/outside air switching door 430, a blower motor 440, an evaporator 450, an expansion valve 451, a condenser 452, a compression machine (compressor) 453, an electric fan 454, an electric motor 455, a heater 460, an air outlet 470, an inside air sensor 480, and an outside air sensor 490.

Air conditioning unit 400 can execute the ventilation operation to supply air outside vehicle 100 (outside air) into passenger compartment 500, and the cooling operation to supply cool air into passenger compartment 500. In the ventilation operation, outside air is drawn in through outside air intake port 420. Outside air passes through inside/outside air switching door 430, and is blown toward evaporator 450 by blower motor 440. In the ventilation operation, a cooling function of evaporator 450 is stopped. The cooling function of evaporator 450 will be described later. A heating function of heater 460 is stopped. Outside air is thus supplied to air outlet 470 without substantially changing the temperature. Air outlet 470 supplies the outside air by blowing it into passenger compartment 500. On the other hand, in the cooling operation, air (inside air) in vehicle compartment 500 is drawn through inside air intake port 410. Inside air passes through inside/outside air switching door 430, and is blown toward evaporator 450 by blower motor 440. In the cooling operation, evaporator 450 carries out the cooling function. The heating function of heater 460 is stopped. Inside air is thus changed to air having a low temperature by evaporator 450, and is supplied to air outlet 470. It is noted that the temperature of the air delivered through air outlet 470 in the cooling operation (target blow temperature TAO (° C.)) is determined in consideration of various factors such as a set temperature of air conditioning unit 400, the environment (for example, solar radiation) in which vehicle 100 is placed, and the like.

The cooling function of evaporator 450 is implemented by compressor 453 that compresses a refrigerant, condenser 452 for cooling the refrigerant, and expansion valve 451 for ejecting the refrigerant into evaporator 450. Condenser 452 is cooled by winds from electric fan 454. Electric motor 455 drives electric fan 454. Electric power from battery 360 is utilized for the operation of air conditioning unit 400 including the operation of compressor 453 and electric motor 455, and the operation of heater 460. Electric power received by plug-in mechanism 370 from the external power supply can also be utilized for the operation of air conditioning unit 400.

Inside air sensor 480 measures an air temperature in passenger compartment 500 (Tr). Outside air sensor 490 measures an air temperature outside vehicle 100 (Tam).

Passenger compartment 500 is a space occupied by the user. Passenger compartment 500 is provided with a ventilation opening 510. In the ventilation operation, for example, the air in passenger compartment 500 (indoor air) passes an exhaust path (not shown) through ventilation opening 510, and is exhausted to the outside of vehicle 100 through vent duct 600. The exhaust path may be provided to allow heat exchange between the exhausted indoor air and battery 360. Passenger compartment 500 is provided with an operating panel 520. The user operates operating panel 520 to perform air conditioning, for example.

Operating panel 520 is provided with an operation button for setting vehicle 100 into a READY-ON state (a state in which the vehicle can run), for example. Where vehicle 100 is in the READY-ON state, ECU 200 can determine that the user is in the vehicle, and if not so, that is, when vehicle 100 is in a READY-OFF state (a state in which the vehicle cannot run), ECU 200 can determine that the user is not in the vehicle. A sensor may be provided in a driver's seat to determine whether the user is in the vehicle or not.

Communication unit 700 communicates with the outside of vehicle 100. Communication unit 700 makes wireless communication with the electronic key as shown in FIG. 1, for example.

With the structure described above, vehicle 100 can charge battery 360 by utilizing the electric power from the power supply outside vehicle 100. Air conditioning is performed by ECU 200 controlling air conditioning unit 400. Air conditioning can be performed before the user rides in vehicle 100 (pre-air conditioning). The user can operate the electronic key described previously to perform the pre-air conditioning (remote pre-air conditioning). Air conditioning is also performed while the user is in vehicle 100 (operated air conditioning). The user can operate operating panel 520 or operate the electronic key to perform the operated air conditioning.

In the remote pre-air conditioning or the operated air conditioning, both the ventilation operation and the cooling operation can be executed. The operated air conditioning while the user is in the vehicle requires the instantaneous effect of cooling. On the other hand, the remote pre-air conditioning while the user is not in the vehicle does not require an effect as instantaneous as that of the operated air conditioning. In vehicle 100, therefore, ECU 200 controls air conditioning unit 400 such that a condition in which the ventilation operation is executed in the remote pre-air conditioning is more relaxed than a condition in which the ventilation operation is executed in the operated air conditioning. The expression that the condition in which the ventilation operation is executed is relaxed means that the remote pre-air conditioning has more states (or frequencies, for example) in which the ventilation operation is permitted than the operated air conditioning. In an extreme case, in the operated air conditioning, air conditioning is performed such that the ventilation operation is seldom performed.

Figure 5:
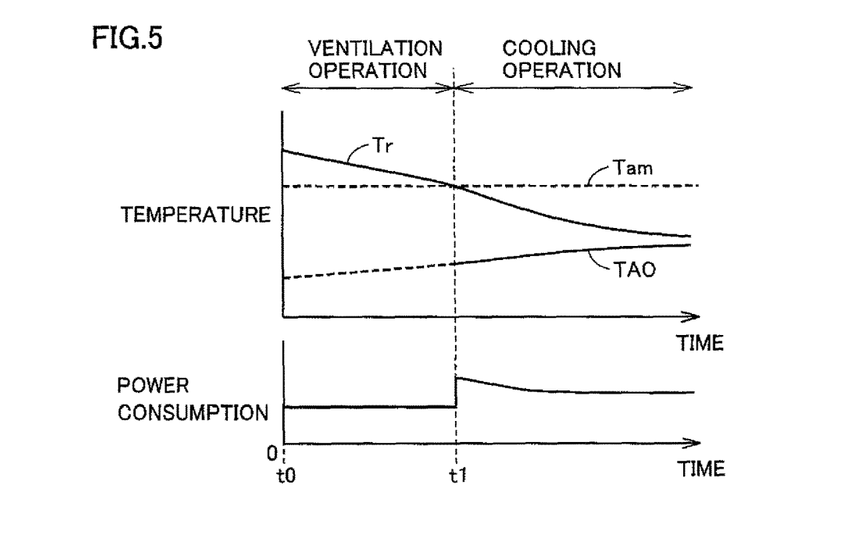
FIG. 5 is a graph for illustrating pre-air conditioning in the vehicle according to the embodiment.

FIG. 5 is a graph for illustrating the pre-air conditioning in the vehicle according to the embodiment. In this graph, the pre-air conditioning is started at time t0. The upper part of the graph in FIG. 5 represents temperatures in the passenger compartment. At time t0, a temperature in the passenger compartment Tr is higher than an outside air temperature Tam. In this case, the passenger compartment can be cooled by the ventilation operation. The ventilation operation is thus executed. While it is not always necessary to set target blow temperature TAO in the ventilation operation, if the TAO is set, it changes as shown by the broken line, for example. With the ventilation operation, temperature in the passenger compartment Tr decreases to be close to outside air temperature Tam. At time t1, temperature in the passenger compartment Tr becomes equal to outside air temperature Tam. From time t1, the execution of the cooling operation is begun. With the cooling operation, temperature in the passenger compartment Tr further decreases to be close to target blow temperature TAO shown by the solid line.

The lower part of the graph shown in FIG. 5 represents power consumption for the pre-air conditioning. Power consumption is very small between times t0 to t1 during which the ventilation operation is executed. This is because the cooling function of evaporator 450 shown in FIG. 4 is stopped. A particularly major factor is that the power consumption by compressor 453 and electric motor 455 has become unnecessary. At time t1, the execution of the cooling operation is begun. In the cooling operation, a certain amount of electric power is consumed. However, since the power consumption by the ventilation operation is very small, the electric power (amount of electric power) consumed throughout the pre-air conditioning is significantly reduced. Specifically, power consumption is reduced by the amount of electric power required to realize target blow temperature TAO shown by the broken line in the ventilation operation.

Figure 6:
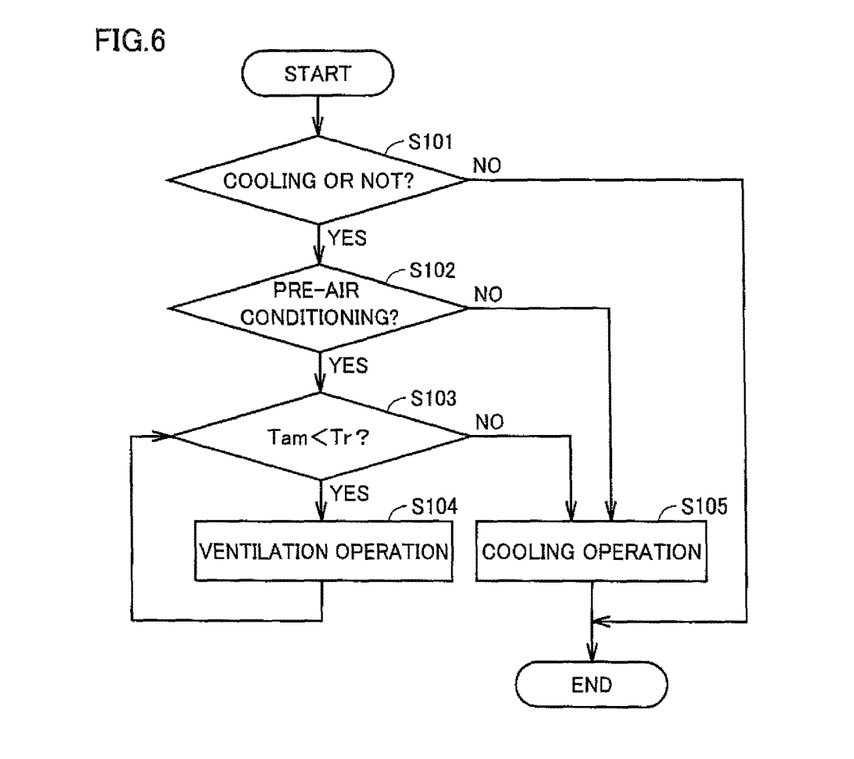
FIG. 6 is a flow chart for illustrating processing executed in air conditioning.

FIG. 6 is a flow chart for illustrating processing executed in air conditioning. The processing of this flow chart is executed by ECU 200 shown in FIG. 4. The processing shown in this flow chart is begun by the user's operation concerning air conditioning, for example.

With reference to FIG. 6, it is initially determined whether air conditioning (cooling) is required or not (Step S101). It is determined that cooling is not required if target blow temperature TAO, calculated (computed) from a set temperature of air conditioning set by the user's operation, for example, is higher than temperature in the passenger compartment Tr, and it is determined that cooling is required if the TAO is lower than Tr. Where air conditioning is required (YES in Step S101), the processing proceeds to Step S102. On the other hand, where cooling is not required (NO in Step S101), the processing of the flow chart ends.

In Step S102, it is determined whether the pre-air conditioning is to be performed or not. For example, where the user is not in the vehicle (where the vehicle is in the READY-OFF state), it is determined that the pre-air conditioning is to be performed. Conversely, where the user is in the vehicle, it is determined that the pre-air conditioning is not to be performed (the operated air conditioning is to be performed, for example). Where the pre-air conditioning is to be performed (YES in Step S102), the processing proceeds to Step S103. On the other hand, where the pre-air conditioning is not to be performed (NO in Step S102), the processing proceeds to Step S105.

In Step S103, it is determined whether outside air temperature Tam is lower than temperature in the passenger compartment Tr or not. Where outside air temperature Tam is lower than temperature in the passenger compartment Tr (YES in Step S103), the processing proceeds to Step S104. On the other hand, where outside air temperature Tam is not lower than temperature in the passenger compartment Tr (NO in Step S103), the processing proceeds to Step S105. It is noted that where outside air temperature Tam and temperature in the passenger compartment Tr are equal, the processing may proceed to Step S104, rather than Step S105.

In Step S104, the ventilation operation is executed. Temperature in the passenger compartment Tr thus decreases to be close to outside air temperature Tam. The processing subsequently returns to Step S103 again.

In Step S105, the cooling operation is executed. Temperature in the passenger compartment Tr thus decreases rapidly. The processing of the flow chart subsequently ends.

According to the flow chart shown in FIG. 6, in the pre-air conditioning, the ventilation operation may be executed by the processing in Step S104, and therefore, the frequency with which the ventilation operation is executed is relatively high. On the other hand, in air conditioning except for the pre-air conditioning, such as in the operated air conditioning, the ventilation operation is not executed by the processing in Step S104, and therefore, the frequency with which the ventilation operation is executed is relatively low. That is, the pre-air conditioning and the operated air conditioning have different ratios of the ventilation operation and the cooling operation. It is noted that in the cooling operation in Step S105, the ventilation operation may partially be performed. In that case also, the ratio of the cooling operation is set to be higher in Step S105 than in Step S104.

First Modification

The user may specify a temperature (set temperature) of the pre-air conditioning by operating the electronic key, for example. When the set temperature is relatively low, it can be assumed that the user desires rapid cooling (with a high instantaneous effect). It is therefore preferred to perform air conditioning in consideration of the set temperature.

Figure 7:
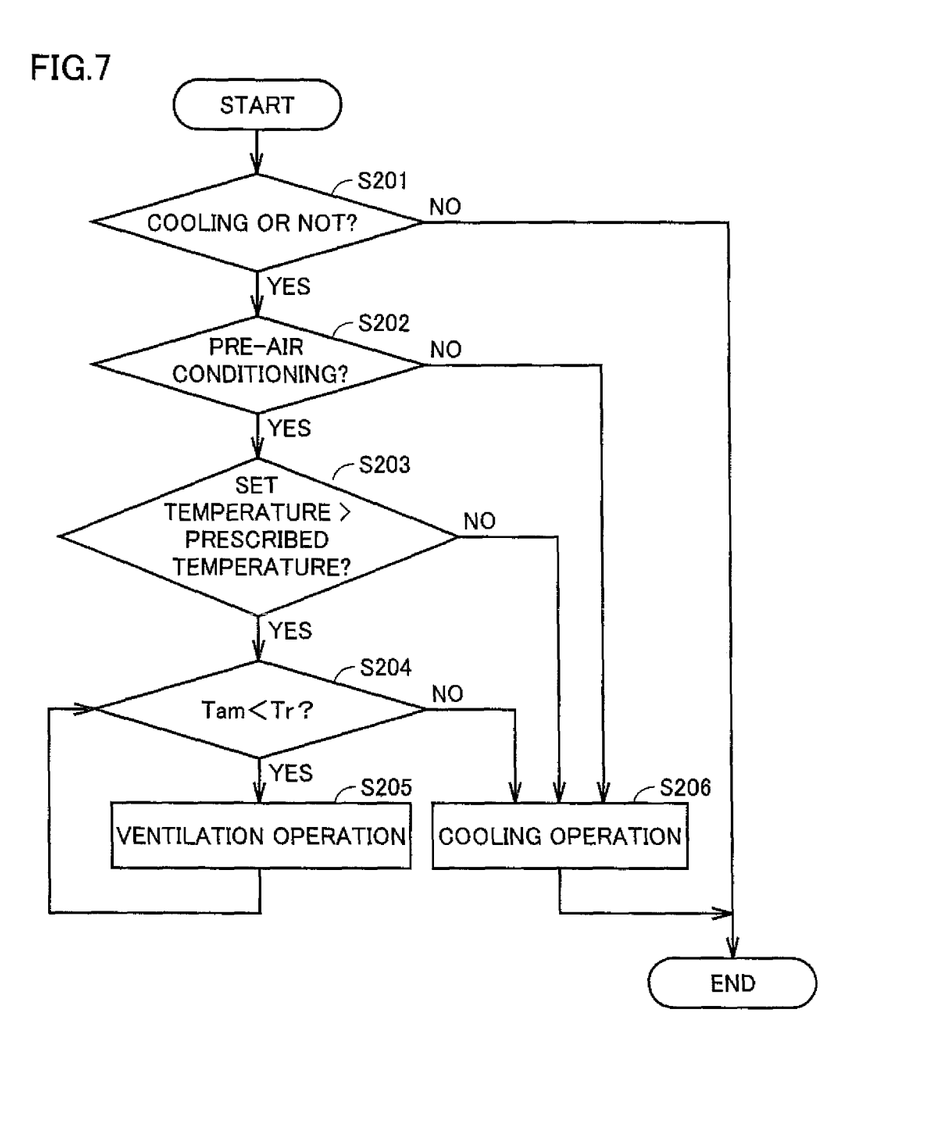
FIG. 7 is a flow chart for illustrating processing executed in air conditioning in consideration of a set temperature.

FIG. 7 is a flow chart for illustrating processing carried out in air conditioning in consideration of a set temperature. Since Step S201 in FIG. 7 is the same as Step S101 in FIG. 6, the description thereof is not repeated.

With reference to FIG. 7, it is determined in Step S202 whether the pre-air conditioning is to be performed or not. Where the pre-air conditioning is to be performed (YES in Step S202), the processing proceeds to Step S203. On the other hand, where the pre-air conditioning is not to be performed (NO in Step S202), the processing proceeds to Step S206.

In Step S203, it is determined whether the set temperature is higher than a prescribed temperature. This prescribed temperature is a relatively low temperature in a range of settable temperatures, and is a lower limit temperature or a temperature near the lower limit temperature. Where the set temperature is higher than the prescribed temperature (YES in Step S203), the processing proceeds to Step S204. On the other hand, where the set temperature is not higher than the prescribed temperature (NO in Step S203), the processing proceeds to Step S206.

In Step S205, the ventilation operation is executed to realize cooling. The processing is subsequently returned to Step S204 again. In Step S206, the cooling operation is executed to realize rapid cooling. The processing of the flow chart subsequently ends. In this way, air conditioning in consideration of the set temperature is performed.

Second Modification

The user may specify a maximum time (set time) in which the execution of the pre-air conditioning is continued by operating the electronic key, for example. When the set temperature is relatively short, it can be assumed that the user desires cooling with a high instantaneous effect. It is therefore preferred to perform air conditioning in consideration of the set time.

Figure 8:
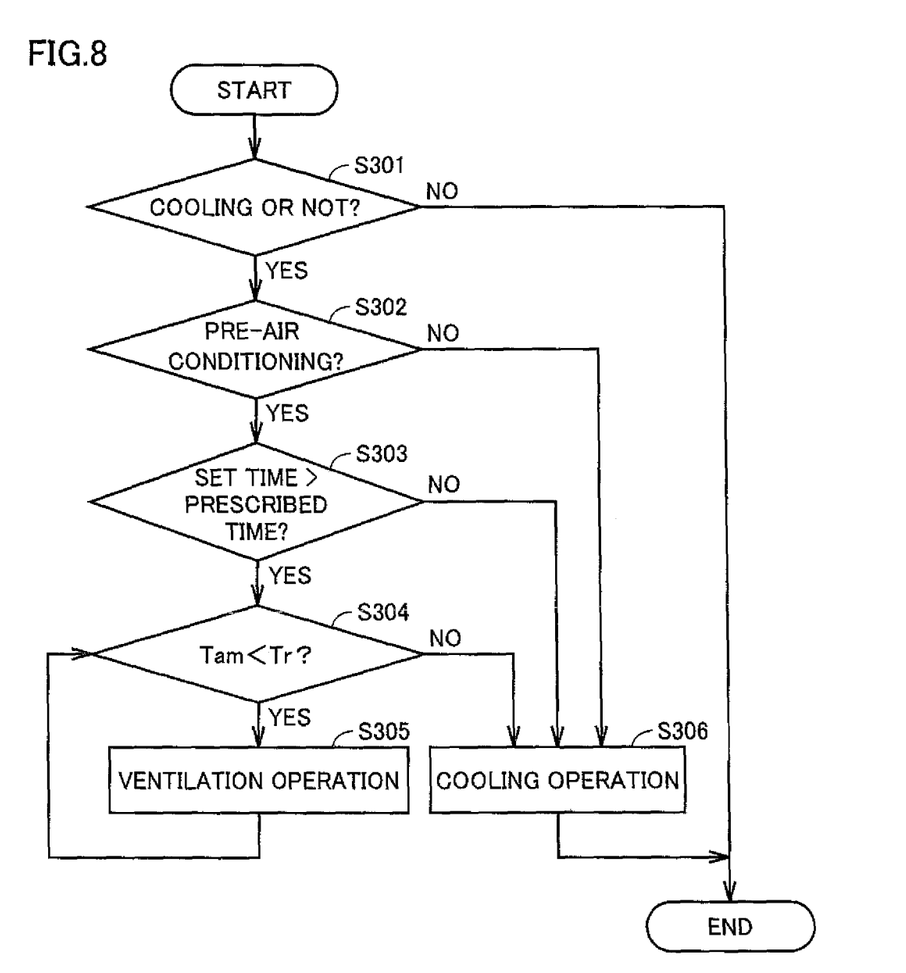
FIG. 8 is a flow chart for illustrating processing executed in air conditioning in consideration of a set time.

FIG. 8 is a flow chart for illustrating processing executed in air conditioning in consideration of a set time. Since Step S301 in FIG. 8 is the same as Step S101 in FIG. 6, the description thereof is not repeated.

With reference to FIG. 8, it is determined in Step S302 whether the pre-air conditioning is to be performed or not. Where the pre-air conditioning is to be performed (YES in Step S302), the processing proceeds to Step S303. On the other hand, where the pre-air conditioning is not to be performed (NO in Step S302), the processing proceeds to Step S306.

In Step S303, it is determined whether the set time is longer than a prescribed time. The prescribed time is a relatively short time in a range of settable times, and is a minimum time or a time near the minimum time (about 5 minutes, for example). Where the set time is greater than the prescribed time (YES in Step S303), the processing proceeds to Step S304. On the other hand, where the set time is not greater than the prescribed time (NO in Step S303), the processing proceeds to Step S306.

In Step S305, the ventilation operation is executed to realize cooling. The processing subsequently returns to Step S304 again. In Step S306, the cooling operation is executed to realize rapid cooling. The processing of the flow chart subsequently ends. In this way, air conditioning in consideration of the set time is performed.

Third Modification

The ventilation operation cools the inside of the passenger compartment by utilizing air outside the vehicle. Therefore, as the outside air temperature becomes relatively high, the effect of cooling by the ventilation operation becomes more unlikely to be obtained. It is therefore preferred to perform air conditioning in consideration of the outside air temperature.

Figure 9:
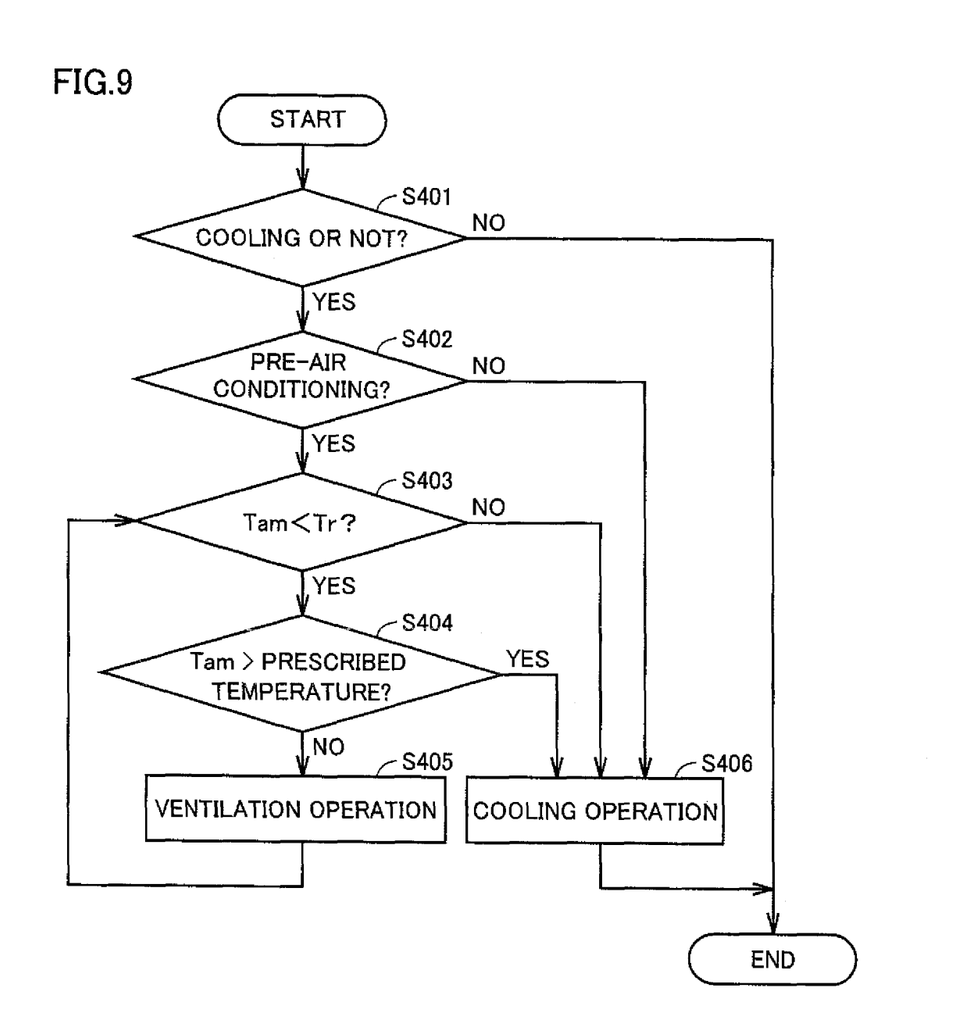
FIG. 9 is a flow chart for illustrating processing executed in air conditioning in consideration of an outside air temperature.

FIG. 9 is a flow chart for illustrating processing executed in air conditioning in consideration of an outside air temperature. Since Step S401 in FIG. 9 is the same as Step S101 in FIG. 6, the description thereof is not repeated.

With reference to FIG. 9, it is determined in Step S402 whether the pre-air conditioning is to be performed or not. Where the pre-air conditioning is to be performed (YES in Step S402), the processing proceeds to Step S403. On the other hand, where the pre-air conditioning is not to be performed (NO in Step S402), the processing proceeds to Step S406.

In Step S403, it is determined whether outside air temperature Tam is lower than temperature in the passenger compartment Tr or not. Where outside air temperature Tam is lower than temperature in the passenger compartment Tr (YES in Step S403), the processing proceeds to Step S404. On the other hand, where outside air temperature Tam is not lower than temperature in the passenger compartment Tr (NO in Step S403), the processing proceeds to Step S406.

In Step S404, it is determined whether outside air temperature Tam is higher than a prescribed temperature or not. This prescribed temperature is a high temperature that exceeds 40° C. or even 45° C., for example. Where outside air temperature Tam is higher than the prescribed temperature (YES in Step S404), the processing proceeds to Step S406. On the other hand, where outside air temperature Tam is not higher than the prescribed temperature (NO in Step S404), the processing proceeds to Step S405.

In Step S405, the ventilation operation is executed to realize cooling. The processing subsequently returns to Step S403 again. In Step S406, the cooling operation is executed to realize rapid cooling. The processing of the flow chart subsequently ends. In this way, air conditioning in consideration of the outside air temperature is performed.

Fourth Modification

If the ventilation operation in the pre-air conditioning is prolonged, sufficient cooling may not be performed within a pre-air conditioning set time (10 minutes, for example). It is therefore preferred to perform air conditioning in consideration of a pre-air conditioning time.

Figure 10:
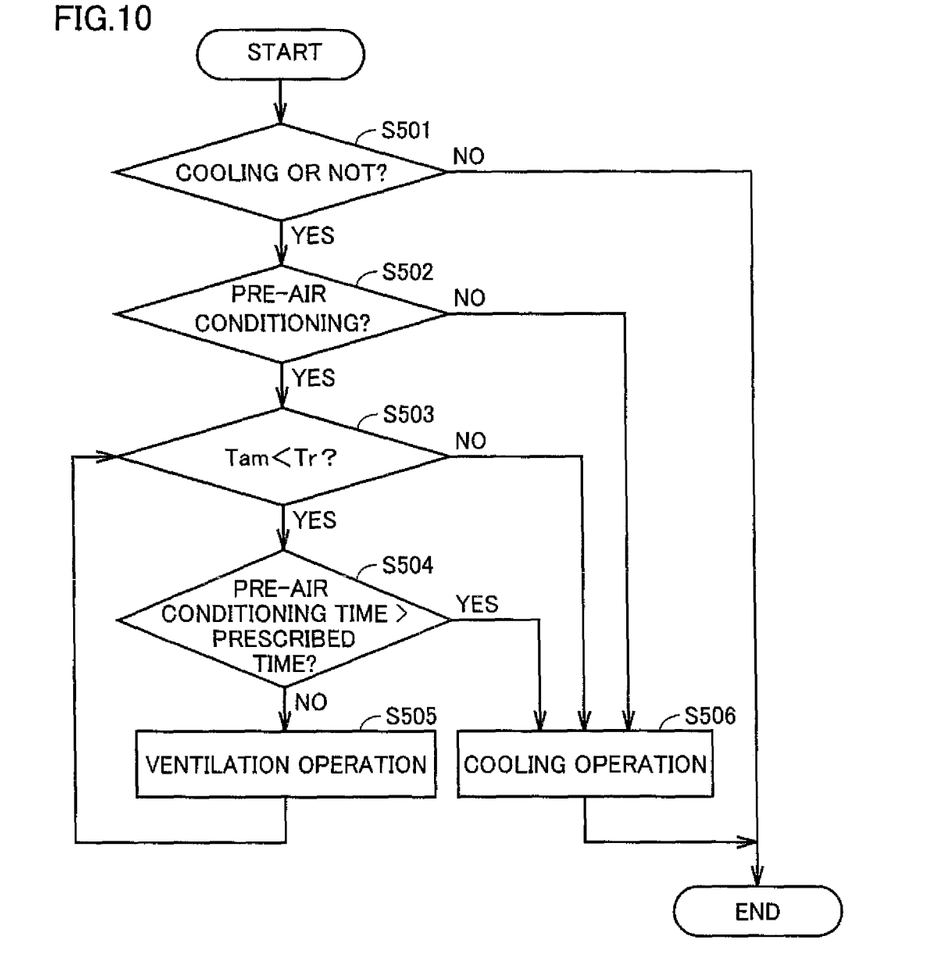
FIG. 10 is a flow chart for illustrating processing executed in the pre-air conditioning in consideration of a pre-air conditioning time.

FIG. 10 is a flow chart for illustrating processing executed in the pre-air conditioning in consideration of the pre-air conditioning time. Since Step S501 in FIG. 10 is the same as Step S101 in FIG. 6, the description thereof is not repeated.

With reference to FIG. 10, it is determined in Step S502 whether the pre-air conditioning is to be performed or not. Where the pre-air conditioning is to be performed (YES in Step S502), the processing proceeds to Step S503. On the other hand, where the pre-air conditioning is not to be performed (NO in Step S502), the processing proceeds to Step S506.

In Step S503, it is determined whether outside air temperature Tam is lower than temperature in the passenger compartment Tr or not. Where outside air temperature Tam is lower than temperature in the passenger compartment Tr (YES in Step S503), the processing proceeds to Step S504. On the other hand, where outside air temperature Tam is not lower than temperature in the passenger compartment Tr (NO in Step S503), the processing proceeds to Step S506.

In Step S504, it is determined whether a time during which the pre-air conditioning has been performed (pre-air conditioning time) is longer than the prescribed time (5 minutes, for example) or not. Where the pre-air conditioning time is longer than the prescribed time (YES in Step S504), the processing proceeds to Step S506. On the other hand, where the pre-air conditioning time is not longer than the prescribed time (NO in Step S504), the processing proceeds to Step S505.

In Step S505, the ventilation operation is executed to realize cooling. The processing subsequently returns to Step S503 again. In Step S506, the cooling operation is executed to realize rapid cooling. The processing of the flow chart subsequently ends. In this way, air conditioning in consideration of the pre-air conditioning time is performed.

Lastly, the embodiment of the present invention will be summarized. With reference to FIG. 4, vehicle 100 according to the embodiment includes an air conditioning apparatus (air conditioning unit 400) configured to be capable of executing ventilation operation to supply air outside vehicle 100 into a passenger compartment 500, and cooling operation to supply cool air into passenger compartment 500; and a control unit (ECU 200) that causes the air conditioning apparatus (air conditioning unit 400) to execute remote air conditioning in which air conditioning is performed while a user is not in vehicle 100, and operated air conditioning in which air conditioning is performed by the user's operation while the user is in vehicle 100. The control unit (ECU 200) controls the air conditioning apparatus (air conditioning unit 400) such that a condition in which the ventilation operation is executed in the remote air conditioning is more relaxed than a condition in which the ventilation operation is executed in the operated air conditioning.

Preferably, as shown in FIG. 6, the control unit (ECU 200) controls the air conditioning apparatus (air conditioning unit 400) such that in the remote air conditioning, the ventilation operation is executed (Step S104) where an air temperature outside vehicle 100 is lower than that inside passenger compartment 500 (YES in Step S103), and the cooling operation is executed (Step S105) where the air temperature outside vehicle 100 is higher than the air temperature inside passenger compartment 500 (NO in Step S103).

More preferably, as shown in FIG. 7, the control unit (ECU 200) controls the air conditioning apparatus (air conditioning unit 400) such that in the remote air conditioning, the cooling operation is executed (Step S206) where a set temperature of the air conditioning apparatus (air conditioning unit 400) is not higher than a prescribed temperature (NO in Step S203).

Alternatively, as shown in FIG. 8, the control unit (ECU 200) controls the air conditioning apparatus (air conditioning unit 400) such that in the remote air conditioning, the cooling operation is executed (Step S306) where a set time of the remote air conditioning is not longer than a prescribed time (NO in Step S303).

Moreover, preferably, as shown in FIG. 9, the control unit (ECU 200) controls the air conditioning apparatus (air conditioning unit 400) such that in the remote air conditioning, the cooling operation is executed (Step S406) where the air temperature outside vehicle 100 is higher than the air temperature inside passenger compartment 500 (NO in Step S403), and controls the air conditioning apparatus (air conditioning unit 400) such that where the air temperature outside vehicle 100 is lower than the air temperature inside passenger compartment 500 (YES in Step S403), the cooling operation is executed (Step S406) when the air temperature outside vehicle 100 is higher than the prescribed temperature (YES in Step S404), and the ventilation operation is executed (Step S405) when the air temperature outside the vehicle is not higher than the prescribed temperature (NO in Step S404).

Alternatively, as shown in FIG. 10, the control unit (ECU 200) controls the air conditioning apparatus (air conditioning unit 400) such that in the remote air conditioning, the cooling operation is executed (Step S506) where the air temperature outside vehicle 100 is not lower than the air temperature inside passenger compartment 500 (NO in Step S503), and controls the air conditioning apparatus (air conditioning unit 400) such that where the air temperature outside vehicle 100 is lower than the air temperature inside passenger compartment 500 (YES in Step S503), the cooling operation is executed (Step S506) when a time during which the remote air conditioning is being executed has become longer than a prescribed time (YES in Step S504), and the ventilation operation is executed (Step S505) when a time during which the remote air conditioning is being executed is not longer than the prescribed time (NO in Step S504).

It is noted that vehicle 100 may also be configured to include an air conditioning apparatus (air conditioning unit 400) configured to be capable of executing ventilation operation to supply air outside vehicle 100 into passenger compartment 500, and cooling operation to supply cool air into passenger compartment 500; and a control unit (ECU 200) that causes the air conditioning apparatus (air conditioning unit 400) to execute the remote air conditioning in which air conditioning is performed by remote operation, and the operated air conditioning in which air conditioning is performed by operation of an operating panel in passenger compartment 500. The control unit (ECU 200) controls the air conditioning apparatus (air conditioning unit 400) such that a condition in which the ventilation operation is executed in the remote air conditioning is more relaxed than a condition in which the ventilation operation is executed in the operated air conditioning.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle comprising:

an air conditioning apparatus configured to be capable of executing ventilation operation to supply air outside said vehicle into a passenger compartment when an evaporator stops a cooling function, and cooling operation to supply cool air cooled by the evaporator into said passenger compartment; and a control unit that causes said air conditioning apparatus to execute remote air conditioning in which air conditioning is performed while a user is not in said vehicle, and operated air conditioning in which air conditioning is performed by operation by the user while the user is in said vehicle, when a target blowing temperature determined based on a set temperature of the air conditioning apparatus set by the user is lower than an air temperature in a passenger compartment, the control unit determining that cooling is necessary, when it is determined that cooling is necessary and when the remote air conditioning is executed (i) the control unit controlling the air conditioning apparatus to execute the ventilation operation when the set temperature of the air conditioning apparatus is higher than a prescribed temperature and an outside air temperature of the vehicle is lower than the air temperature in the passenger compartment, (ii) the control unit controlling the air conditioning apparatus to execute the cooling operation when the set temperature of the air conditioning apparatus is lower than the prescribed temperature, and (iii) the control unit controlling the air conditioning apparatus to execute the cooling operation when the outside air temperature of the vehicle is higher than the air temperature in the passenger compartment.

* * * * *